US011747236B2

(12) United States Patent
Kyritsis et al.

(10) Patent No.: US 11,747,236 B2
(45) Date of Patent: Sep. 5, 2023

(54) FLOW MEASUREMENT FOR A GAS TURBINE ENGINE

(71) Applicant: VIRGINIA TECH INTELLECTUAL PROPERTIES, INC., Blacksburg, VA (US)

(72) Inventors: Vasileios Kyritsis, Derby (GB); Peter Loftus, Derby (GB); Maurice Bristow, Derby (GB); Todd Lowe, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/017,082

(22) Filed: Sep. 10, 2020

(65) Prior Publication Data

US 2022/0074816 A1  Mar. 10, 2022

(51) Int. Cl.
*G01M 15/14* (2006.01)
*G01N 29/14* (2006.01)

(52) U.S. Cl.
CPC ............ *G01M 15/14* (2013.01); *G01N 29/14* (2013.01)

(58) Field of Classification Search
CPC ......... G01M 15/14; G01N 29/14; G01F 1/667
See application file for complete search history.

(56) References Cited

U.S. PATENT DOCUMENTS

| | | |
|---|---|---|
| 3,936,606 A | 2/1976 | Wanke |
| 5,478,199 A | 12/1995 | Gliebe |
| 5,531,124 A | 7/1996 | Kim et al. |
| 9,556,791 B2 | 1/2017 | DeSilva et al. |
| 9,746,360 B2* | 8/2017 | DeSilva ..................... G01F 1/66 |
| 10,281,307 B2 | 5/2019 | Lowe et al. |
| 2005/0060982 A1* | 3/2005 | Mani ....................... B64D 33/02 60/226.1 |
| 2008/0175703 A1 | 7/2008 | Lugg |
| 2008/0181769 A1* | 7/2008 | Wilson ..................... F02K 3/06 415/181 |
| 2009/0078052 A1 | 3/2009 | Twerdochlib |
| 2010/0111675 A1* | 5/2010 | Wojtyczka ............ F04D 29/664 415/200 |
| 2012/0150413 A1 | 6/2012 | Bunce et al. |

(Continued)

FOREIGN PATENT DOCUMENTS

| | | |
|---|---|---|
| CN | 109446187 A | 3/2019 |
| EP | 1517022 A2 | 3/2005 |

(Continued)

OTHER PUBLICATIONS

U.S. Appl. No. 17/017,194, filed Sep. 10, 2020 in the name of Peter Loftus et al.

(Continued)

*Primary Examiner* — Natalie Huls
*Assistant Examiner* — Cynthia L Davis
(74) *Attorney, Agent, or Firm* — Oliff PLC

(57) ABSTRACT

A turbomachine having an air flow measurement system. The system comprises a plurality of acoustic sensors upstream of a compressor of the turbomachine. The acoustic sensors are configured to transmit acoustic waveforms through an intake airflow to further acoustic sensors. The acoustic sensors are located in a single plane and mounted at angular spacing about a central axis of an intake.

20 Claims, 9 Drawing Sheets

(56) References Cited

U.S. PATENT DOCUMENTS

| | | | |
|---|---|---|---|
| 2015/0247455 A1* | 9/2015 | Sheridan | F02C 3/10 60/772 |
| 2015/0260557 A1 | 9/2015 | DeSilva et al. | |
| 2015/0308352 A1 | 10/2015 | Kupratis et al. | |
| 2017/0176265 A1 | 6/2017 | DeSilva et al. | |
| 2017/0356773 A1 | 12/2017 | Lowe et al. | |
| 2018/0038282 A1 | 2/2018 | Kugimiya et al. | |
| 2019/0003912 A1* | 1/2019 | Sato | G01M 9/06 |
| 2019/0293405 A1 | 9/2019 | Lipstein et al. | |
| 2020/0011982 A1* | 1/2020 | Saripella | G01B 21/16 |
| 2020/0256888 A1* | 8/2020 | Ell | G01P 5/245 |
| 2020/0393328 A1 | 12/2020 | Schleif et al. | |

FOREIGN PATENT DOCUMENTS

| | | |
|---|---|---|
| EP | 2738372 A1 | 6/2014 |
| EP | 2887027 A1 | 6/2015 |
| EP | 3255438 A1 | 12/2017 |
| EP | 3264104 A2 | 1/2018 |
| EP | 3543646 A1 | 9/2019 |
| EP | 3584557 A1 | 12/2019 |
| GB | 2 207 756 B | 9/1991 |
| WO | 2016/094144 A1 | 6/2016 |

OTHER PUBLICATIONS

U.S. Appl. No. 17/017,149, filed Sep. 10, 2020 in the name of Peter Loftus et al.
U.S. Appl. No. 17/398,817, filed Aug. 10, 2021 in the name of Vasileios Kyritsis et al.
Oct. 26, 2021 Extended European Search Report issued in European Patent Application No. 21190488.3.
Oct. 28, 2021 Extended European Search Report issued in European Patent Application No. 21190489.1.
Feb. 9, 2021 Search Report issued in Great Britain Patent Application No. GB2014210.5.
Oct. 29, 2021 Extended European Search Report issued in European Patent Application No. 21190490.9.
Mar. 11, 2022 Office Action issued in U.S. Appl. No. 17/017,149.
Aug. 3, 2022 Office Action Issued In U.S. Appl. No. 17/017,149.
Oct. 31, 2022 Office Action issued in U.S. Appl. No. 17/017,194.
Nov. 17, 2022 Office Action issued in U.S. Appl. No. 17/017,149.
Feb. 15, 2022 Extended Search Report issued in European Patent Application No. 21190487.5.
Feb. 15, 2023 Office Action Issued in U.S. Appl. No. 17/017,149.
Mar. 3, 2023 Office Action issued in U.S. Appl. No. 17/398,817.
Apr. 25, 2023 Office Action issued in U.S. Appl. No. 17/017,194.
Jun. 2, 2023 Office Action issued in U.S. Appl. No. 17/017,149.
Jul. 5, 2023 Notice of Allowance issued in U.S. Appl. No. 17/017,194.

* cited by examiner

FLOW MEASUREMENT FOR A GAS TURBINE ENGINE

BACKGROUND

Field of the Disclosure

The present disclosure relates to an acoustic measurement system, particularly to an acoustic measurement system for a turbomachine, such as an axial flow engine.

Description of the Related Art

In turbomachines, for example gas turbine engines, measurement of the properties of the air flowing into or through the engine can be used to determine the performance of the engine. For example, the average flow velocity or the mass flow of the airflow can be used to calculate the performance and/or efficiency of the engine.

Measurements of total and static pressure may be performed using conventional devices, such as Pitot tubes. Pitot tubes comprise an aperture configured to face into the oncoming airflow and must protrude/extend into the airflow, for example, to avoid a boundary airflow layer in an inner surface of the casing/ducting surrounding the airflow. Other devices, such as static ports must be mounted within the casing.

The extent which the Pitot tubes extend into the airflow is restricted in order to reduce disruption to the airflow, thus the Pitot tubes can only sample the airflow properties in a limited region of the airflow.

Sampled measurements made by the Pitot tubes in the limited region of the airflow are assumed to have a correlation with the overall (bulk) airflow flowing into/through the engine. However, the correlation must be modelled or estimated to calculate the bulk airflow from the sampled measurements. Furthermore, the samples in the limited region may not be representative of the bulk airflow, for example, it may be influenced by the boundary layer of the airflow along the casing. Therefore, the correlation model may not be robust to a changing operating condition and so the calculation of the bulk airflow may not be accurate.

Another problem faced when attempting to measure flow rates on axial flow machines such as gas turbine engines is that compressibility effects of the flow become relevant for high volumetric flow rates. This complicates models that might need to be used to correlate sensor readings to overall/bulk flow rate values.

Conventional models rely on velocity profiles attained during analytical or experimental calibration and do not account for unassessed conditions. Also, average pressures and temperatures are used to determine mass flow rate from volumetric flow rate. However, the conditions for a flow regime within the interior of an engine are highly dynamic.

The present disclosure aims to overcome or ameliorate one or more of the above problems.

SUMMARY OF THE DISCLOSURE

According to a first aspect there is provided a turbomachine having an air flow measurement system, the air flow measurement system comprising: a plurality of acoustic sensors comprising at least one acoustic transmitter configured to transmit an acoustic waveform through an intake airflow for the flow machine to an acoustic receiver; and where the acoustic sensors are located in a single plane and mounted at angular spacing about a central axis of the intake airflow.

The engine may comprise a casing surrounding the central axis and defining the intake, wherein the acoustic sensors may be provided on the casing.

The acoustic sensors may be provided as a circumferential array about the casing.

The acoustic sensors may not protrude into the airflow and/or are mounted behind a gas-washed surface of the intake.

The acoustic sensors may be located downstream of an intake throat. The acoustic sensors may be located upstream of a rotor of the turbomachine, such as a compressor/fan rotor. The acoustic sensors may be located upstream any/all rotors of the turbomachine.

The acoustic sensors may be configured to generate tomographic data of the air flow through the intake.

The turbomachine may comprise between 2 and 40 acoustic sensors.

The turbomachine may comprise an internal component axially extending within the airflow and intercepting the single plane defined by the plurality of sensors, the internal component comprising a further acoustic sensor configured to communicate with the plurality of sensors.

The internal component may rotate about an axial axis and the further sensor is configured to rotate with the internal component.

The internal component may comprise a rotor hub and/or nose cone.

The turbomachine may comprise an acoustic liner surrounding a rotor and configured to absorb vibrations generated by rotation of the rotor, the acoustic sensors located upstream of the acoustic liner.

The acoustic sensors may be mounted in a nacelle and/or rotor case of the turbomachine.

The turbomachine may comprise an internal component axially extending within the airflow and intercepting the flow area. The internal component may comprise a further acoustic sensor configured to communicate with the plurality of sensors. The internal component may comprise/be a rotor, e.g. arranged to rotate about a longitudinal/central axis of the intake or flow area. The further sensor may be configured to rotate with the internal component. The internal component may comprise a rotor hub and/or nose cone.

The turbomachine may comprise a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft.

Optionally, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to a second aspect there is provided a system configured to determine air flow through a turbomachine, the system comprising: a plurality of acoustic sensors provided upstream a compressor of the turbomachine; the acoustic sensors comprising at least one acoustic transmitter configured to transmit an acoustic waveform through the intake airflow to an acoustic receiver; where the acoustic sensors are located in a single plane, and mounted at angular spacing about a central axis of the intake; and a processing system configured to receive signals from the acoustic sensors and determine the flow rate of the intake airflow.

The processing system may be configured to determine a time of flight of the acoustic waveform between the at least two acoustic sensors.

The processing system may be configured to determine the average flow velocity of the intake airflow.

The processing system may be configured to determine one or more: the mass flow; static temperature; or static pressure of the intake airflow.

The acoustic sensors may be configured to determine the flow profile across a cross-section of the airflow.

The acoustic sensors may be configured to generate tomographic data of the air flow through the intake.

According to third aspect, there is provided a method of determining air flow properties of an intake airflow of a turbomachine, the method comprising the steps of: providing signal communication with a plurality of acoustic sensors located in a single plane provided upstream a compressor of the turbomachine; determining a time of flight of an acoustic waveform between said plurality of acoustic sensors; and using the time of flight between the plurality of sensors to determine an average flow velocity of the intake airflow.

The method may comprise using the time of flight between the plurality of sensors to determine an average mass flow of the intake airflow.

The time of flight between the plurality of sensors may be used to determine the average flow velocity of the flow area. The time of flight between the plurality of sensors may be used to determine the average mass flow of the flow area. A flow profile over the flow area, e.g. across a cross-section of the flow, may be determined.

The acoustic sensors may be mounted at or adjacent an intake opening for the flow machine.

The acoustic sensors may be mounted in a nacelle and/or rotor case of the turbomachine. An acoustic liner may surround a rotor and be configured to absorb vibrations generated by rotation of the rotor, e.g. the compressor/fan. The acoustic sensors may be located upstream of the acoustic liner.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 6 shows an example acoustic sensor array and the paths there-between;

DETAILED DESCRIPTION OF THE DISCLOSURE

Embodiments will now be described by way of example only, with reference to the Figures.

Figure 1:
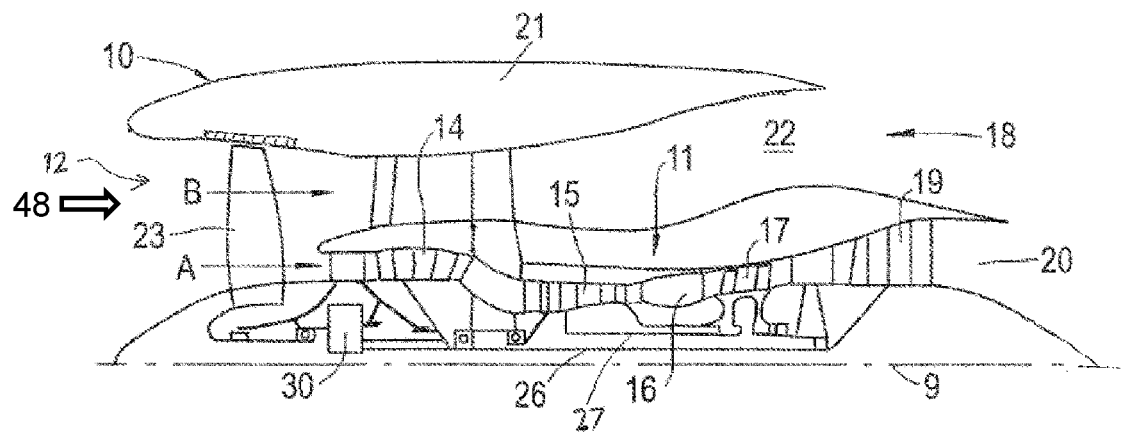
FIG. 1 is a sectional side view of a gas turbine engine.

FIG. 1 illustrates a gas turbine engine 10 having a principal rotational axis 9. The engine 10 comprises an air intake 12 which receives an intake airflow 48 and a propulsive fan 23 that generates two airflows: a core airflow A and a bypass airflow B. The intake airflow 48 comprises the sum total of the air flowing into the operational upstream end of the engine 10, with the sum total of the core airflow A and the bypass airflow B substantially equal to the intake airflow 48.

The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
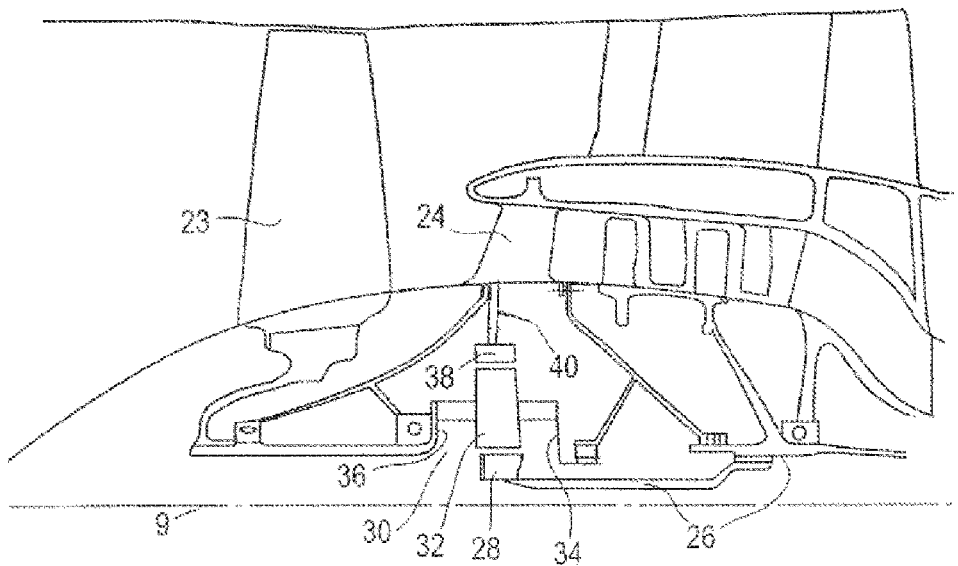
FIG. 2 is a close up sectional side view of an upstream portion of a gas turbine engine.

An exemplary arrangement for a geared fan gas turbine engine 10 is shown in FIG. 2.

The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
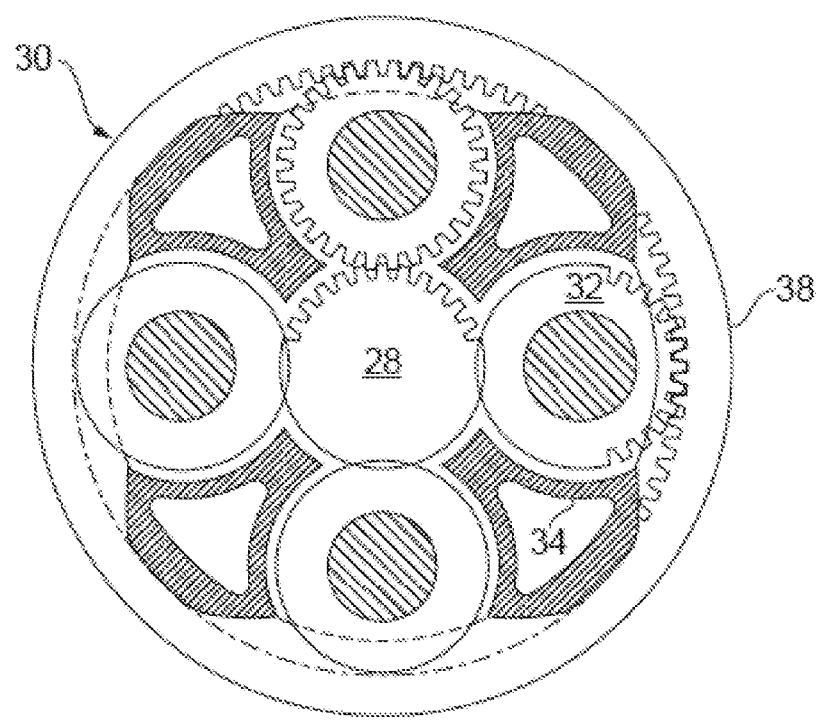
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The present disclosure will now proceed in relation to a gas turbine engine, however it will be appreciated that the present disclosure may used in other types of axial flow engine/machine.

Figure 4:
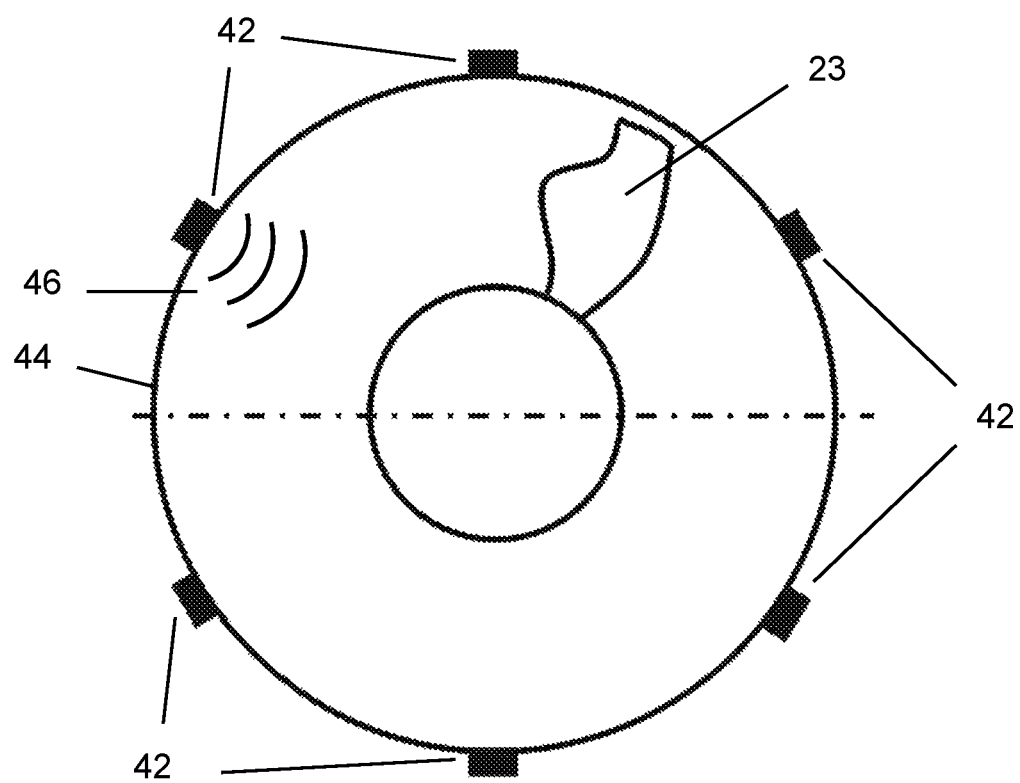
FIG. 4 is a schematic front view of an intake of a gas turbine engine having acoustic flow sensors.
Figure 5:
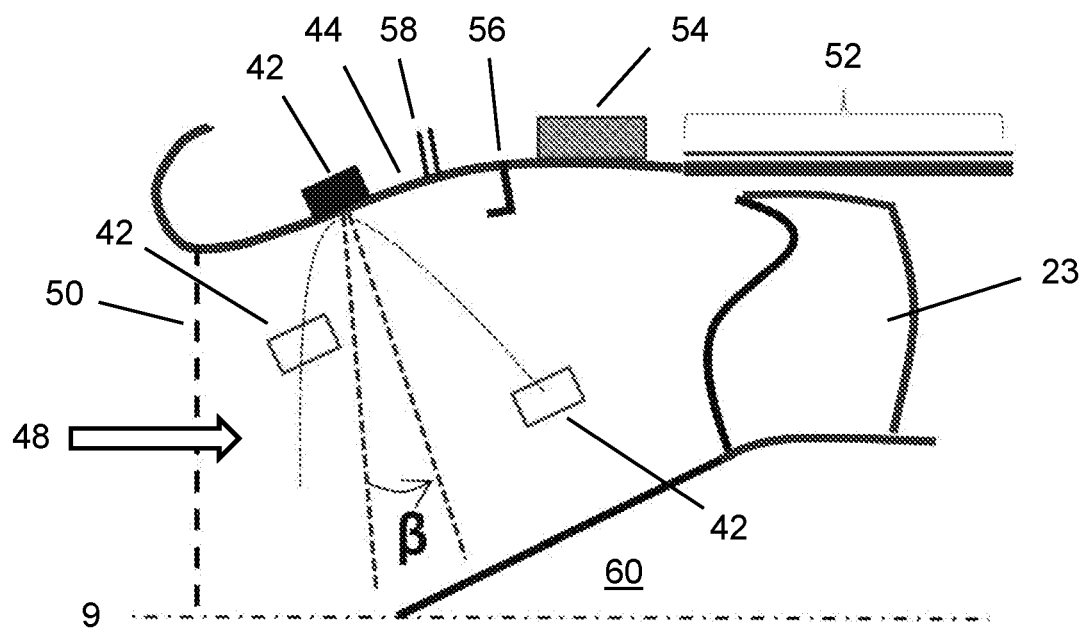
FIG. 5 is a schematic sectional view of an intake of a gas turbine engine having acoustic flow sensors.

As shown in FIGS. 4 and 5, the gas turbine engine 10 comprises a plurality of acoustic sensors 42. Preferably, the acoustic sensors 42 comprise ultrasonic sensors. The ultrasonic sensors 42 are provided on a casing 44 surrounding and bounding the air intake 12 and the intake air flow 48 of the engine 10. The casing 44 may comprise an inner surface of the nacelle 21. The intake should be considered any area upstream of the engine compressor(s), e.g. upstream of the fan 23.

In an example, between two and forty sensors are provided. Typically, greater than four sensors would be used for suitable coverage over the flow area. The sensors may be spaced around the axis of rotation, e.g. as a circumferential array, and may or may not be equally spaced. However, it can be appreciated that increasing the number of sensors may increase the fidelity & accuracy of the measurements. The invention is therefore not limited to such an example, and any number of sensors may be used as required, depending on the application.

The ultrasonic sensors 42 comprise an ultrasonic transmitter and/or an ultrasonic receiver. Each individual sensor 42 may comprise a transmitter, receiver or a transmitter/receiver pair.

The ultrasonic transmitters comprise an ultrasonic transducer configured to transmit an ultrasonic waveform 46 into the intake airflow 48.

The ultrasonic receivers are configured to receive and detect the ultrasonic waveforms 46 transmitted by the ultrasonic transmitters. In an example, the receivers are located in substantially the same location as the transmitters and/or are formed integrally with the transmitters (i.e. they form part of the same assembly). In other examples, the receivers are located in different locations to the transmitters and/or are formed as a separate assembly to the transmitters.

The sensors 42 are removed from the intake airflow 48 (i.e. they do not protrude into, obstruct or otherwise interfere with the airflow 48). The sensors 42 may be mounted on, or behind, the outer surface of the casing 44 (i.e. within the nacelle 21 casing) and/or may be mounted flush with the inner surface of the surface of the casing 44 (e.g. so that an edge/side of the sensor is flush with the gas-washed surface).

In other examples, the sensors 42 may protrude into the airflow. This may intentionally create turbulence, for example, to study airflow properties within the engine.

The ultrasonic sensors 42 are spaced about the circumference of the casing 44, preferably in an evenly distributed manner. The ultrasonic sensors 42 may be spaced about casing 44 such that each sensor 42 is diametrically opposed another sensor 42.

Alternatively, the sensors 42 may be unevenly distributed, for example, in clusters. The sensors may be angularly spaced about the axis 9.

The ultrasonic sensors 42 are located in and/or oriented in a single plane (e.g. each of the individual sensors lies in an imaginary plane bounded by the other sensors). The plane may be substantially flat. In other examples, the plane arcuate, curved, or the like. The exact form of the plane is not pertinent to the disclosure at hand, however, it should be appreciated that providing the sensors in a single plane means that the sensors are circumferentially spaced about the intake. Therefore, no two sensors within a given system are placed in the same circumferential position (i.e. no two sensors are only axially spaced apart without circumferential spacing).

The plane in this example is substantially orthogonal to net direction of the local airflow 48. In other embodiments, the entire plane and/or portions of the plane are non-orthogonal to net direction of the local airflow 48.

In an example, the plane is substantially orthogonal to the principal engine axis 9. However, the plane could be offset, e.g. obliquely, from orthogonal to the airflow/axis if desired.

In the example of a flat plane, one or more line of sight between the plurality of respective sensors 42 may be oriented to lie within a single plane. All transmitters/receivers may be arranged to transmit/receive signals within the single plane.

The ultrasonic sensors 42 are located in an upstream portion of the engine 10, upstream of the compressor stage of the engine. The sensors 42 are upstream of the fan 23. The sensors 42 may be located at, adjacent or closely behind the intake 12. In this example, the sensors 42 are between an intake throat 50 (i.e. the narrowest point of the intake 12) and a fan casing 52 (i.e. the portion of the casing 44 surrounding the fan 23).

In an example, the sensors 42 are offset in a downstream direction relative to the intake throat 50. In other examples, the sensors 42 are located upstream of the intake throat. In any examples, upstream and/or downstream directions may be assumed to be directions along axis 9 or parallel thereto.

The engine 10 may comprise an acoustic liner 54 surrounding the casing 44 and configured to reduce acoustic vibrations therein. The acoustic liner is located adjacent and/or upstream an upstream side of the fan casing 52. The sensors 42 may be located upstream of the acoustic liner 54.

The sensors 42 may be located upstream or downstream of other sensing equipment located on the casing 44. The other sensing equipment may comprise one or more of: a Pitot tube 56; or static pressure tube 58; or a temperature probe.

The engine may comprise an internal component located within the casing 44, i.e. a solid region within the flow field. The internal component may axially extend through/within the casing 44. For example, the internal component may comprise a portion of the rotor hub (for attachment of the fan blades 23 to the shaft); the spinner/nose cone 60; or a static portion/casing of the core 11 of the engine.

Figure 6:
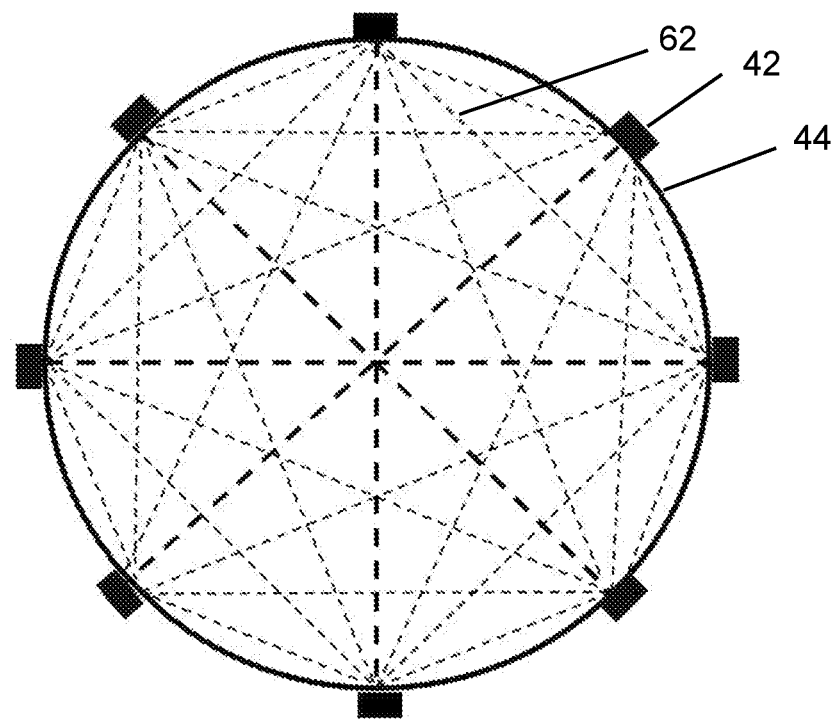

In an example, the sensors 42 are located upstream of the upstream end/tip of the rotor hub and cone, such that the nose cone 60 does not intercept the plane of the sensors 42. As shown in FIG. 6, the positioning of the sensors 42 prevents interruption of the line of sight 62 between the plurality of sensors 42, such that each sensor 42 has a line of sight 62 to each of the other sensors 42, thereby allowing ultrasonic communication between the sensors 42 in a substantially straight path.

Each line of sight 62 between the sensors 42 can be sampled to determine the average properties of the airflow 48 along the lines of sight 62 (i.e. the ultrasonic sensors measure an average value of the airflow properties between the sensors and not only at a single point proximal the sensors 42 themselves). The properties of the airflow 48 can be sampled along a plurality of the lines of sight 62 between each of the plurality of sensors 42, to provide a plurality of samples across the airflow 48. The airflow properties are sampled at multiple spatially separated points within the airflow, for example, including boundary flow layers adjacent the surface of the casing 44.

As shown in FIG. 6, the plurality of samples provides a 'mesh' of samples across the airflow 48, which spans many regions of the flow field/area.

Figure 7:
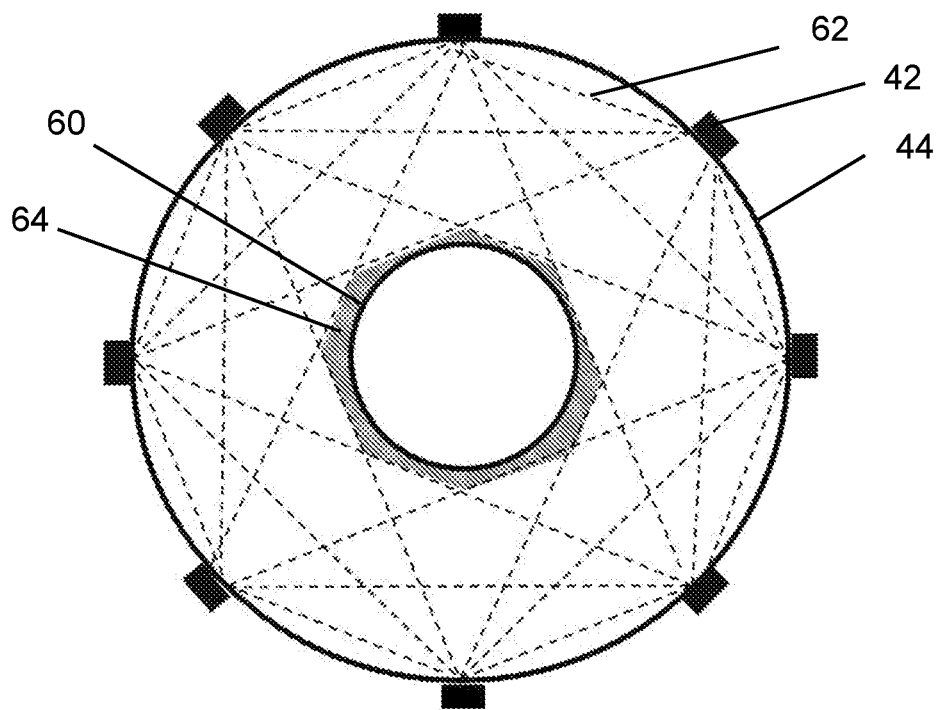
FIG. 7 shows a further example acoustic sensor array for a different flow path.

In a different example, the sensors 42 are located downstream of the cone 60 tip, such that the cone 60 or rotor hub is present within (i.e. crosses) the plane of the sensors 42. As shown in FIG. 7, lines of sight 62 between opposing sensors 42 are interrupted in an area bounded by the solid region of spinner cone 60, thus preventing ultrasonic communication between those opposing sensors 42.

Due to the interruption of communication between the opposing sensors 42, a deadzone 64 is created (e.g. around the solid body of the cone 60) where measurement of the air flow 48 properties cannot be performed. It can be appreciated that such a problem is present when the internal component comprises other portions of the engine 10, for example, the core 11 of the engine. Such a deadzone 64 may or may not be acceptable in different implementations. For example, if the number of sensors 42 mounted about the casing is increased, the deadzone area may be reduced sufficiently.

Figure 8:
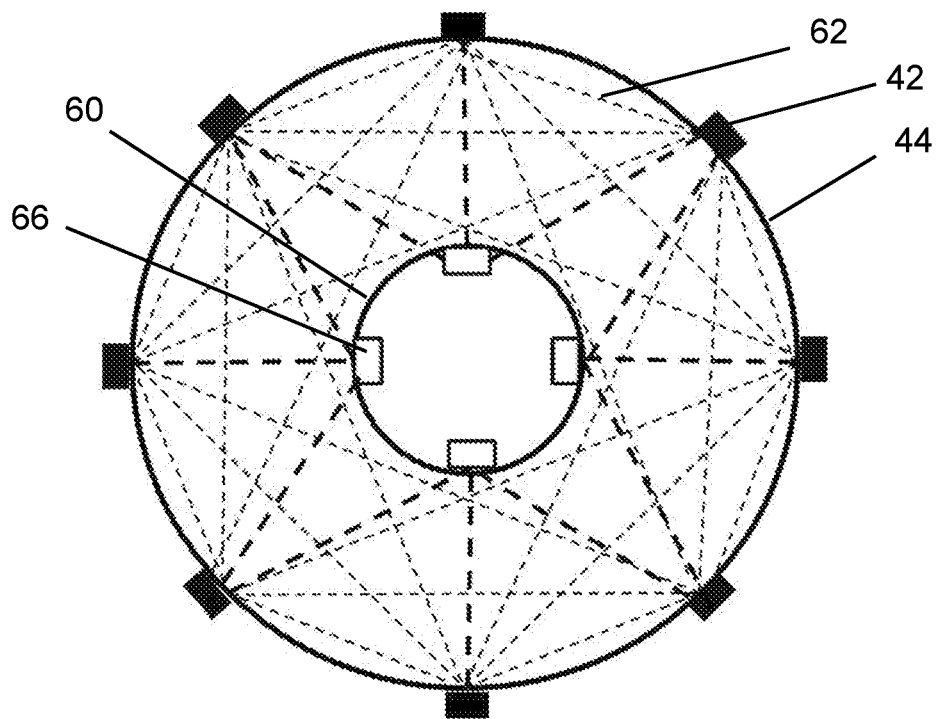
FIG. 8 shows a further example acoustic sensor array.

FIG. 8 shows an alternative example arrangement for use when a solid internal component or body is located in the plane of the sensors. At least one further acoustic sensor 66 is provided on the internal component 60. The further sensor may comprise an ultrasonic sensor 66 configured to operatively communicate with the ultrasonic sensors 42 provided on the casing 44. In an example, between 1 and 6 further sensors 66 are provided. However, it can be appreciated that in any number of further sensors 66 may be provided depending on the application.

The further sensors 66 may be evenly distributed about the circumference of the internal component. In a similar fashion to the sensors 42 on the casing 44, the further sensors 66 may be removed from the air flow 48.

As shown in FIG. 8, line of sight 62 is maintained between the sensors 42 on the casing 44 and the sensors 66 on the internal component, thereby eliminating and/or decreasing the size of the deadzone 64. The line of sight between sensors 42 and 66 passes through a boundary layer flow at the surface of the internal component 60 and so the contribution of the boundary layer to the overall flow profile can be accommodated.

In an example, the further sensor 66 is affixed to the cone 60 of the rotor hub, such that the further sensor 66 rotates with the rotation of the hub, whilst maintaining operative communication with the sensor 42 provided on the casing 44.

Figure 9:
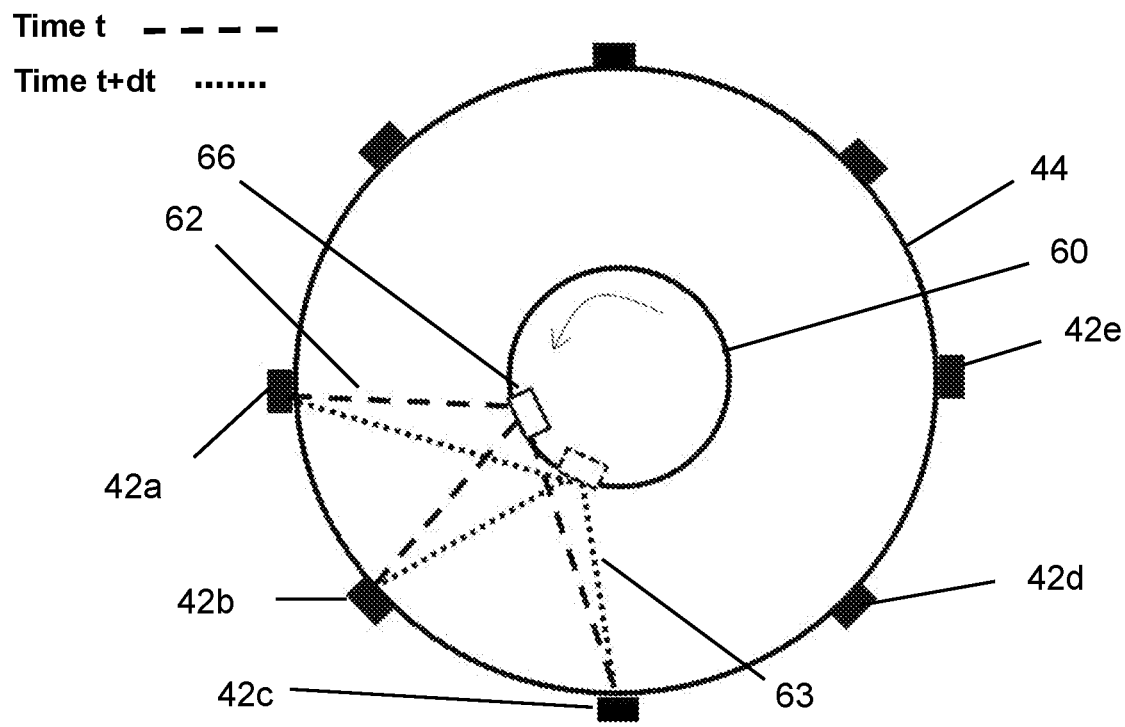
FIG. 9 shows a further example acoustic sensor array accommodating relative rotation.

As shown in FIG. 9, at time 't', the further sensor 66 is in operative communication with a plurality of sensors 42a, 42b, 42c on the casing 44. The lines of sight 62 between the sensors is shown in the heavy dashed lines. At time 't', the properties of the airflow 48 along the lines of sight 62 can be sampled using the sensors 42a, 42b and 42c.

As the further sensor 66 rotates with the hub, the further sensor moves to a new angular position at time 't+dt' (dt being an arbitrary timestep). The further sensor 66 communicates with the same plurality of different sensors 42a, 42b, 42c provided on the casing 44, however, the lines of sight 63 (shown in light dashed lines) have moved to a new location. The properties of the airflow 48 along the lines of sight 63 can be sampled using the same sensors, the portion of airflow 48 sampled at 't+dt' being different from the portion of airflow 48 sampled at time T.

As the further sensor 66 continues to rotate, the further sensor 66 communicates with the next plurality of sensors 42 sequentially about the casing (i.e. 42b, 42c, 42d, then 42c, 42d, 42e and so on). As the further sensor 66 rotates, the lines of sight 63 sweep through the airflow 48 within the casing 44. The properties of the airflow 48 are sampled throughout the rotation of the further sensor 66, thus providing a 'sweeping scan' of the air flow 48 surrounding the hub.

The cone 60 or hub may comprise a plurality of further sensors 66, in a similar fashion to the sensors 42 on the casing 44 or the further sensors 66 shown in FIG. 8. The plurality of further sensors 66 may be distributed evenly about the circumference of the hub 60. Such an arrangement of sensors allows all regions of the flow area to be scanned concurrently during each sweep/rotation.

In some examples, the static lines of sight between static sensors 42 may also be used for readings (e.g. as shown in FIGS. 7 and 8). The total readings may thus comprise, in part, readings taken for a static frame of reference and, in part, readings from a rotating frame of reference.

Figure 10:
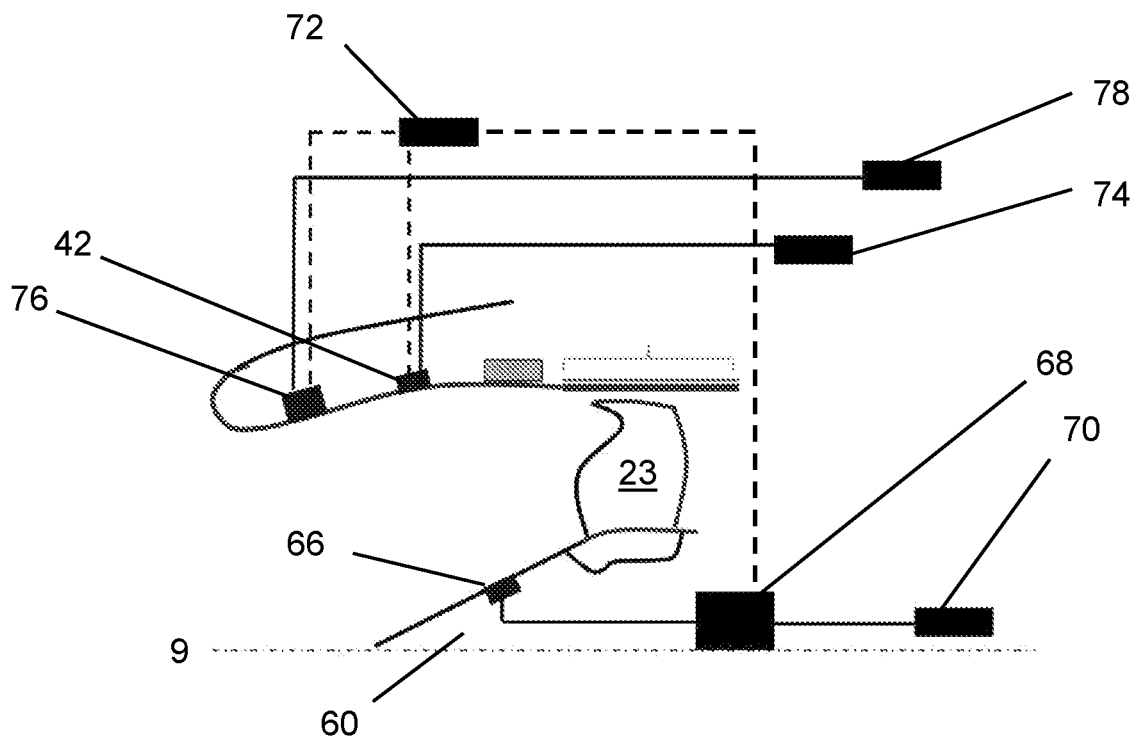
FIG. 10 is a schematic sectional view of a further example of an intake of a gas turbine engine having acoustic flow sensors.

As shown in FIG. 10, the sensors 42 are operatively connected to a power source 74 and a signal processing system 72. The static sensors 42 may have direct electrical (e.g. wired) connection to the signal processing box 72.

The engine 10 comprises a further sensor system 76, e.g. a telemetry system, operatively connected to a power source 78 and the signal processing system, 72. The further sensor system may be located upstream of the sensors 42, e.g. in the nacelles and/or engine intake. The further sensor system 76 is configured to receive the data measured by the rotating sensors 66 wirelessly. The further sensor system then forwards the data to the signal processing box 72.

A rotational electrical coupling 68 may be provided for the further sensors 66. The rotational electrical coupling 68 connects the further sensor 66 to a power source 70 and/or the signal processing system 72, and permits rotation of the further sensor 66 relative the power source 70 and/or the signal processing system 72 whilst maintaining the connection therebetween. The rotational electrical coupling 68 may provide a physical connection (e.g. a wire). In other examples, the rotational electrical coupling 68 comprises wireless transmission (e.g. wireless power or signal transmission).

In some embodiments, the further sensors 66 may be directly operatively connected to the signal processing system 72, thus mitigating the need for the further sensor system 76.

In an example, the engine 10 comprises a second plurality of sensors. The second set of sensors may be located a different axial location on the engine 10 to the first plurality of sensors.

In some examples, the second plurality of sensors may be located in a downstream portion of the engine 10, preferably, at an exit nozzle of the engine 10. The second plurality of sensor may be axially spaced from one another and may not be circumferentially spaced from one another. The second plurality of sensors may perform substantially the same way as described in EP 3255438 A1, incorporation herein by reference.

The processing system 72 is configured to received signals from one or more of: the first plurality of sensors 42; the further sensor(s) 66; or the second plurality of sensors. The processing system 72 comprises one or more computer processor configured to process the signals to calculate the airflow velocity profile, the volumetric flow rate and/or the mass flow of the intake flow 48.

The processing system 72 may be configured to provide signals to the ultrasonic sensors to begin/end ultrasonic transmission and/or reception.

The processing system 72 is in operative communication with the further sensor system 76. The further system 76 may provide values of one or more operational parameter (i.e. values of one or more variable operational parameter) required to calculate volumetric and/or the mass flow rate of the intake flow 48.

The processing system 72 may be configured to log the airflow velocity, volumetric flow and/or the mass flow data over a given period of time. The processing system 72 may analyse the data to provide trends or patterns therein (for example, using regression analysis) according to specific parameters of the engine 10 or engine usage 10 (for example, a particular power or thrust output of the engine 10 or a throttle setting).

The processing system 72 may have an output interface configured to send the data relating to any of the processing inputs or outputs described herein to a further system, such as a monitoring and/or control system for the engine or a subassembly thereof. The further system could be on-board the engine or aircraft, e.g. connected thereto by a data bus or a local wired or wireless network, or else a remote monitoring facility. The output of the processing system 72 could be used: for feedback to a user, e.g. a user interface in an aircraft cockpit; as an input for an operational control system; and/or as an input for an equipment health monitoring system.

Additionally or alternatively, the processing system 72 comprises non-volatile memory for on-board storage of the data.

In some examples, additional conventional measurement devices may be provided to determine the airflow properties in the engine. The conventional devices may be used concurrently with the present system to detect/measure any difference between the two measurement techniques.

Calculation of the Mass Flow of the Intake Airflow

The following mathematical formulation estimates the flow velocity and/or the volumetric-flow of the intake flow 48 of an engine 10 with a known stagnation temperature. Mass-flow rate can be estimated with additional knowledge of stagnation pressure.

Figure 11:
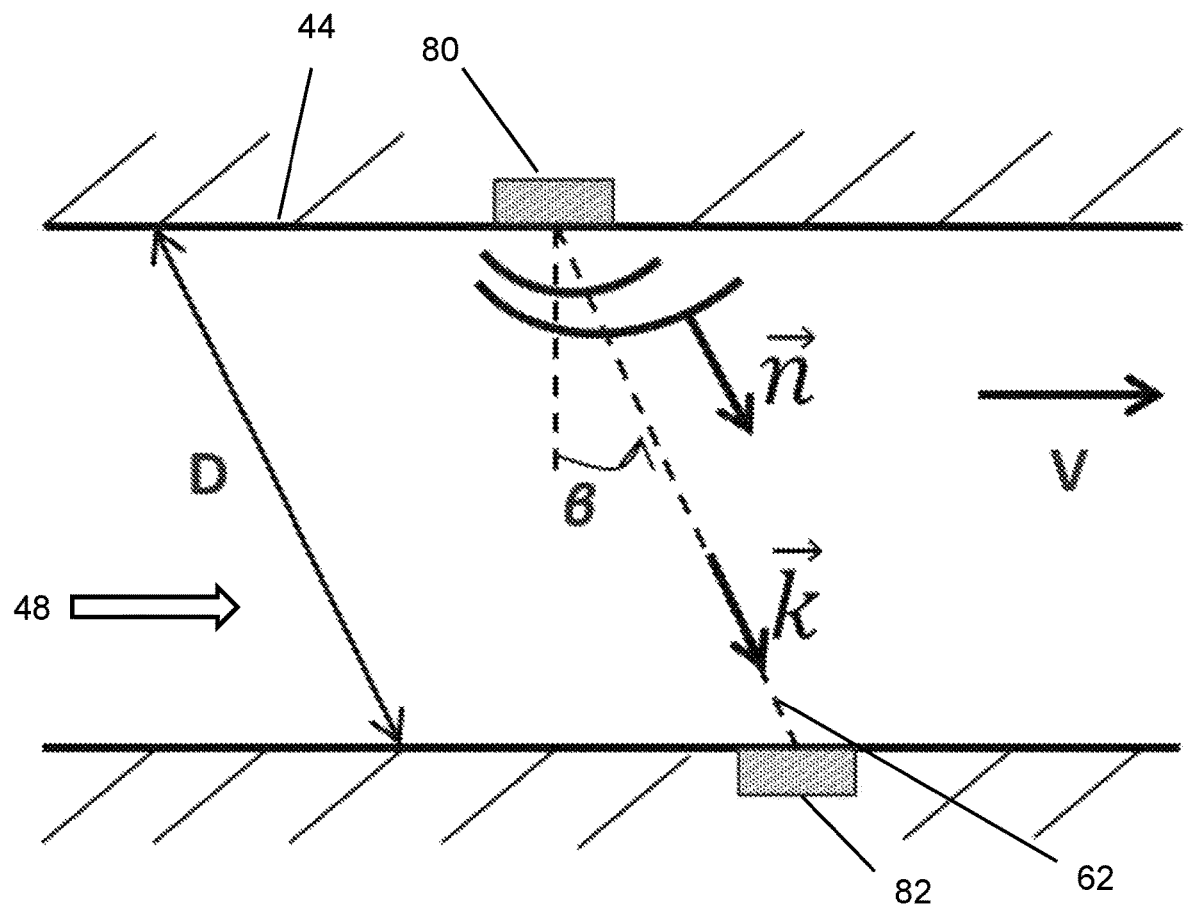
FIG. 11 shows a schematic section view through an acoustic sensor array, indicating parameters used in examples of flow measurement during use.

Nomenclature:
U: velocity of acoustic signal along line-of-sight between transmitter and receiver
V: flow velocity
m: mass-flow
M: flow Mach number
T: flow temperature
h: enthalpy
C: correction factor
α: velocity of sound
β: angle
s: distance
γ: adiabatic index
A=area
ρ=density
p=pressure
R: molar gas constant per molar mass of air
$(\ )_t$: total or stagnation property, e.g. pressure and/or temperature
$(\ )_s$: static property, e.g. pressure and/or temperature
$(\ )_{TOF}$: Time-of-flight averaged quantity
$(\ )_m$: mass-averaged quantity
$(\ )_{eng}$: overall engine parameter
$(\ )_{cr}$: core engine parameter
$(\ )_{aux}$: auxiliary
$(\ )_{thm}$: thermodynamic averaging FIG. 11 shows a schematic of a plurality of sensors 42 configured to measure the velocity flow rate of the intake flow 48 within a casing 44.

An ultrasonic transmitter 80 transmits an ultrasonic waveform 46 into the airflow 48. The ultrasonic waveform 46 interacts with the airflow 48 and the speed the waveform travels through the airflow 48 varies according to various physical characteristics of the airflow 48, as will be described below.

An ultrasonic receiver 82 is located within line of sight 62 of the transmitter. The ultrasonic waveform 46 is received by the ultrasonic receiver 82 and the time between transmitting the ultrasonic waveform 48 and the receiving the waveform is calculated by the processing system 72 to provide a measured time-of-flight ($t_{TOF}$).

Given a distance D of the line of sight between the ultrasonic transmitter 80 and receiver 82 and the measured time-of-flight ($t_{TOF}$) of the acoustic signal, the time-of-flight averaged flow velocity ($V_{TOF}$) can be calculated as:

$$t_{TOF} = \int \frac{ds}{(\alpha \cdot \vec{n} + \vec{V}_{TOF}) \cdot \vec{k}} \Rightarrow V_{TOF} = \qquad \text{Eq.(1)}$$

$$f(\beta, D, t_{TOF}, a) \Rightarrow V_{TOF} = f(\beta, D, t_{TOF}, T_s)$$

given that $a=\sqrt{gRT_s}$ modelling air as a perfect gas.

Figure 12:
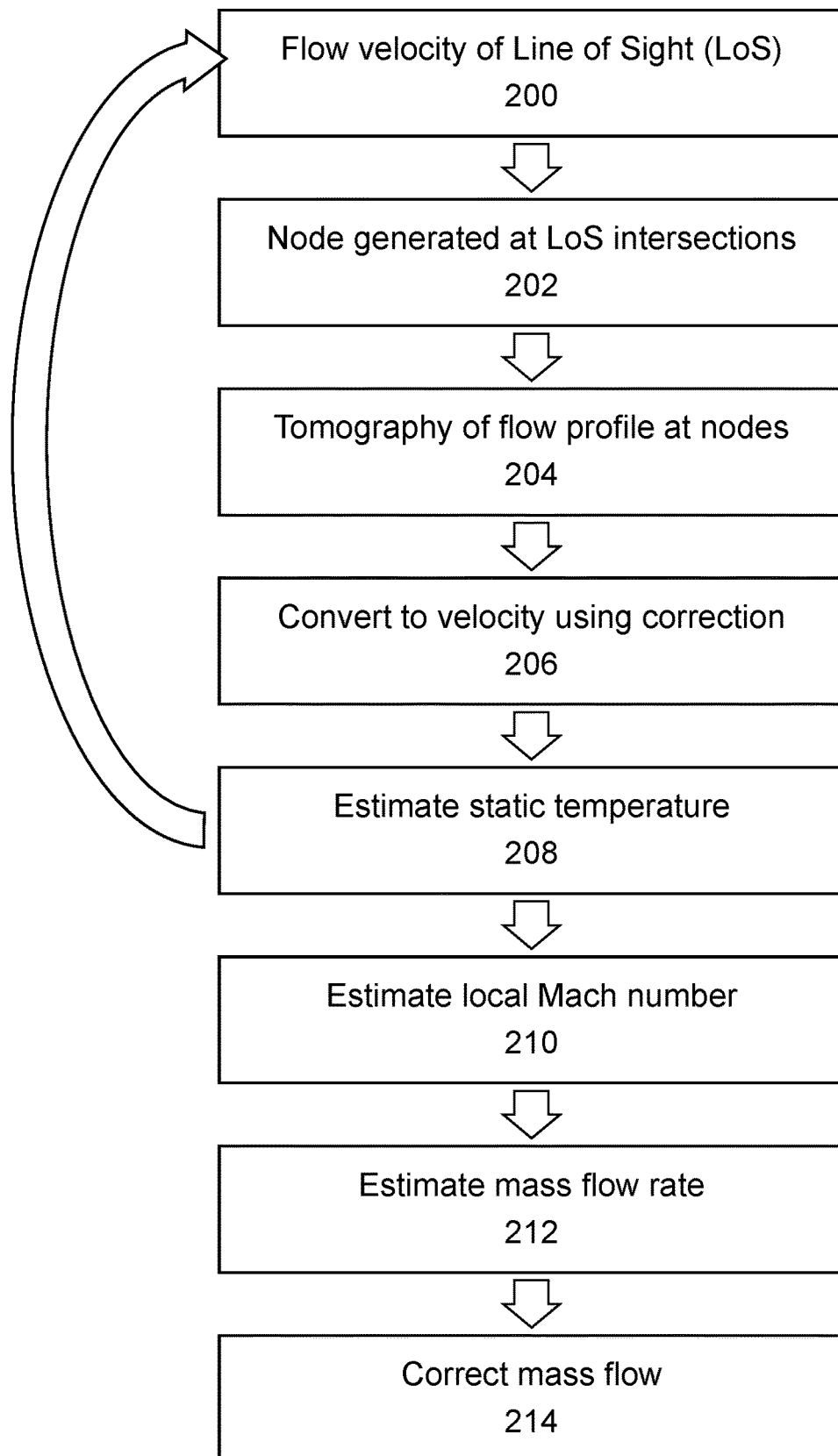
FIG. 12 shows a flowchart of the estimation of one or more engine parameters.

With reference to FIG. 12, in a first step 200, equation (1) is used to determine the mean time-of-flight-averaged velocity along the respective line-of-sight 62 between the transmitter 80 and receiver 82. This step is repeated along each line-of-sight 62 between all the of the respective transmitters 80 and receivers 82 in plane as required.

In a second step 202 and third step 204, once the time-of-flight-averaged velocity of a desired selection/number of lines-of-sight has been calculated, tomography is then applied to derive the time-of-flight-averaged velocity at one or more node; the node being defined by the intersection between two or more lines-of-sight 62.

The output from tomography is the spatial flow velocity profile on the sensor plane. For example, tomography provides a map of the flow velocity profile across the sensor plane. Flow velocity at each node is of time-of-flight currency.

Given the velocity profile, a weighting correction can be applied to the nodes where velocity has been derived, to convert to the appropriate thermodynamic currency. In a fourth step 206, a thermodynamically-weighted velocity ($V_{thm}$), e.g. mass-weighted, is defined using a correction coefficient $C_1$ for velocity $V_{TOF}$ at each node:

$$V_{thm} = C_1 \cdot V_{TOF} \qquad \text{Eq. (2)}$$

In a fifth step 208, the calculation of static temperature $T_s$ at each node is derived using knowledge of stagnation temperature $T_t$ and the flow velocity $V_{thm}$ from Eq.(2). Stagnation temperature $T_t$ at the inlet is known based on flight conditions, or from aircraft or engine measurements. Stagnation temperature $T_t$ has the advantage of having a uniform profile across the inlet and hence the sensor plane, in absence of exhaust gas re-ingestion.

$$h(T_t) - h(T_s) = \frac{V_{thm}^2}{2} \Rightarrow T_s = h^{-1}\left(h(T_t) - \frac{V_{thm}^2}{2}\right) \qquad \text{Eq. (3)}$$

Steps 200 to 208 may be interactively repeated for each the nodes, until convergence to a tolerance.

In a sixth step 210, the calculation of local flow Mach number M at each node is known by application of its defining equation:

$$M = \frac{V_{thm}}{\sqrt{\gamma R T_s}} \qquad \text{Eq.(4)}$$

In a seventh step 212, estimation of the intake mass flow rate is achieved by spatial integration of the non-dimensional mass-flow equation across the sensor plane in the intake:

$$\dot{m}' = \int \frac{p_t \cdot f(M)}{\sqrt{T_t}} \cdot dA \qquad \text{Eq.(5)}$$

In an eight step 214, the estimated intake mass-flow rate is corrected for sampling error using factor $C_2$, given that the nodes are sampling discrete points within the profile. The sampling correction may be calculated on the basis of a database during flight or post flight. The calculation of the sampling correction $C_2$ may use computational methods such as Computational Fluid Dynamics (CFD), or other methods aiming at resolving the flow regime to a required accuracy:

$$\dot{m} = \dot{m}' \cdot C_2 \qquad \text{Eq.(6)}$$

Calculation of the Bypass Airflow Mass

Figure 13:
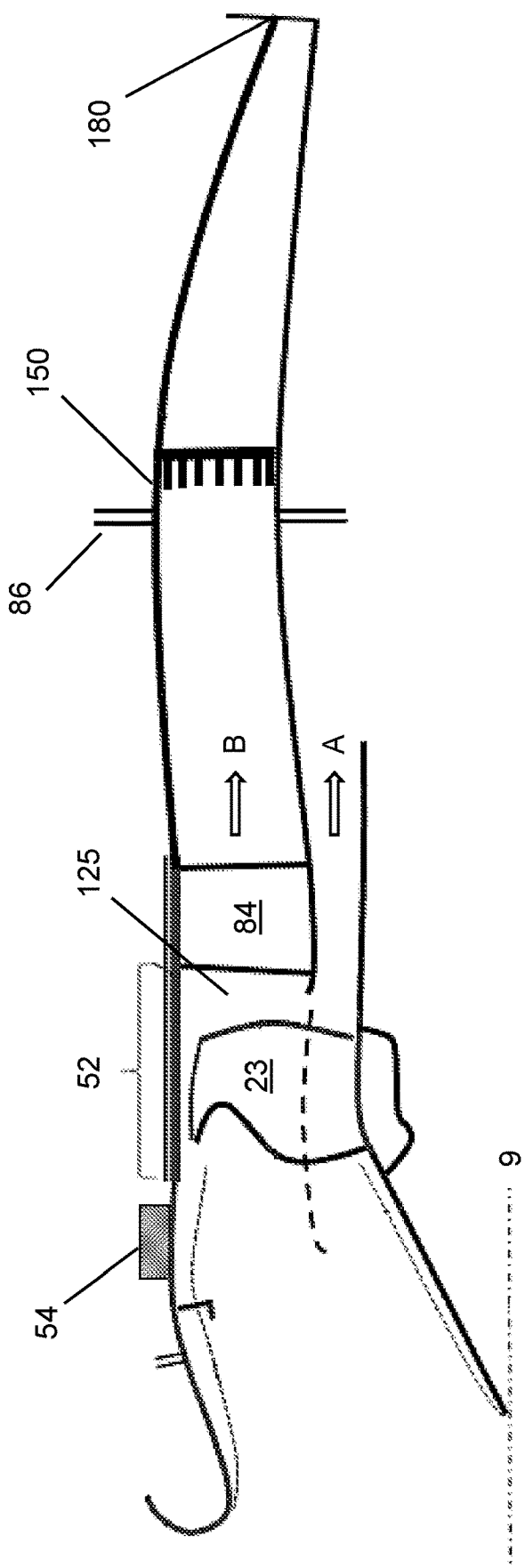
FIG. 13 is a sectional side view of a bypass for a gas turbine engine.

Referring to FIG. 13, the system may be used to determine the mass flow of the bypass air flow B through the engine 10. Bypass mass-flow can be derived from engine mass-flow ($m_{eng}$) by knowledge of mass-flow of the core airflow A ($m_{cr}$). Core mass-flow in-flight can be estimated based on methods calibrated at sea level and/or determined using other conventional methods. The bypass airflow is thus the difference between the total mass-flow into engine and the core mass-flow:

$$m_{125} = m_{eng} - m_{cr} \qquad \text{Eq (7)}$$

Where $m_{125}$ is the bypass airflow at station 125. Station 125 is located downstream of the fan 23, preferably, between the fan 23 and an outlet guide vane 84.

Station 150 is provided downstream of the OGV 84. The mass-flow of the bypass air B at station 150 is equal to the mass flow measured at station 125 with the addition/subtraction of mass-flow due to sources or sinks (e.g. leaks, flow addition or subtraction from auxiliary systems, etc.). The mass flow of such sinks, sources and leaks can be modelled and considered known.

Therefore, the mass flow measured at station 150 can be determined by:

$$m_{150} = m_{125} - m_{leak,1} - m_{aux} \qquad \text{Eq.(8)}$$

Calculation of the Bypass Stagnation Pressure at Charging Plane

The mass flow at station 150 can be used to determine the stagnation pressure $p_t$ via equations (9) and (10):

$$\frac{m\sqrt{T_t}}{p_t \cdot A} = \sqrt{\frac{\gamma}{R}} \cdot f\left(\frac{p_t}{p_s}\right) \qquad \text{Eq.(9)}$$

which can then be solved to determine the stagnation pressure $p_t$ as a function of the other parameters:

$$p_t = f(m, p_s, T_t, A, \gamma, R) \qquad \text{Eq.(10)}$$

The mass-flow m is derived by anemometry at the intake as per the previously described method.

The static pressure $p_s$ is measured at station 150

Stagnation temperature $T_t$ downstream of the fan 23 may be derived from engine analysis of shaft power, assumed based on the fan characteristics or measured using conventional techniques.

$\gamma$, R are known gas properties of the gas, typically air.

A is the geometric (cross-sectional) area at station 150, which can be measured or known from design parameters etc. Corrections to in-flight conditions may be applied to account for expansion and/or contraction due to thermal or mechanical stresses etc.

Given that the geometric area at station 150 is considered in Eq.(10), the derived stagnation pressure is the average stagnation pressure across the passage and all associated flow features, i.e. including boundary layers and secondary flows, if any.

This completes the estimation of the stagnation pressure at charging plane. The calculation of gross thrust can be completed using various published gas path methods.

Calculation of In-Flight Nozzle Discharge Coefficient

Alternatively a new gas method is shown below, which focuses on the derivation of the nozzle discharge coefficient during engine operation.

Station 180 is provided at an outlet of the bypass airflow, for example, at the bypass nozzle throat. Therefore, the ratio of the mass-flow at station 150 $m_{150}$ and station 180 $m_{180}$ can be determined by:

$$\frac{m_{150}}{m_{180}} \cdot \sqrt{\frac{T_{t,150}}{T_{t,180}}} \cdot \frac{p_{t,180}}{p_{t,150}} \cdot \frac{A_{g,180}}{A_{g,150}} \cdot C_{d,180} = w \frac{f(p_{t,150}/p_{s,150})}{f(p_{t,180}/p_{s,180})} \qquad \text{Eq.(11)}$$

Where $C_{d,180}$ is the nozzle discharge coefficient.

Static pressure at station 150 $p_{s,150}$ is measured by conventional means.

Static pressure at station 180 $p_{s,180}$ is typically called "nozzle base pressure". The nozzle base pressure may be considered equal to ambient static pressure. Alternatively, a correction on the ambient static pressure may be applied.

The stagnation pressures at station 150 $p_{t,150}$ and station 180 $p_{t,180}$ are considered to be equal by convention in the existing gas path methods.

Geometric areas at stations 150 $A_{g,150}$ and station 180 $A_{g,180}$ are measured on ground or from known design parameters. Corrections to in-flight conditions may be applied to account for expansion and/or contraction due to thermal or mechanical stresses etc.

Stagnation temperature at station 150 $T_{t,150}$ and station 180 $T_{t,180}$ is conserved in the absence of heat transfer. Alternatively, any heat sources or sinks between stations 150 and 180 can be accounted for as is conventional.

The mass flow ratio, $$\frac{m_{150}}{m_{180}},$$

between stations 150 and 180 is dictated by any mass sources and/or sinks between the stations. In a typical civil turbofan application, a leakage may exist, for example, through the thrust reverser and/or nacelle seals. The amount of leakage can be identified by pod leakage tests carried out on ground.

Thus, the nozzle discharge coefficient $C_{d,180}$ can be determined during testing or flight etc. The determined value may then be compared with calculated or modelled values. The difference between measured and expected value thus may indicated effects due to the nozzle, for example:

External aerodynamic effects, otherwise called installation effects, between the wing and the engine, such as nozzle suppression effects.

Internal aerodynamic effects. Such effects may be profile differences as observed within the engine environment to the profiles tested on a rig, or different levels of turbulence intensity, etc.

Calculation of In-Flight Thrust

The bypass thrust FG may then be calculated as per published gas path methods, using the charging plane thermodynamic parameters and downstream nozzle performance coefficients, with mass-flow being independently known as per equation (8), stagnation pressure being derived from Eq. (10) and the in-flight nozzle discharge coefficient derived from Eq. (11).

Given the one-to-one correlation of velocity to non-dimensional mass-flow to nozzle pressure ratio at any given flight condition, any representation of flow through parameters involved in equations Eq. (1) to (6) can be used as a power setting parameter representing thrust.

Advantages

The present disclosure provides a means to measure the airflow properties of an axial flow engine with minimal intrusion into the airflow.

The present disclosure allows a greater number of sensors to be used, in order to increase the accuracy of the measurement of the properties of the airflow.

The present disclosure provides an airflow measurement system with a reduced sensitivity to the aerodynamic qualities of the airflow (i.e. the variability in the radial and circumferential profile, the amount of turbulence etc.).

The present disclosure provides a measurement system more representative of the average properties of the air flow through the engine.

The present disclosure provides a cross-sectional profile of the air flow through the system. This permits tomographic imaging of the air-flow profile using a series of measurements.

Only a single row/plane of sensors simplifies installation demands and requires installation at the intake of the machine for accurate knowledge of flow thermodynamic properties, i.e. stagnation pressure, temperature, etc.

Mass flow rate can be determined in a practical and effective way using a single row of acoustic sensors.

Location of the acoustic sensors adjacent/upstream of an acoustic liner for the fan may be advantageous in filtering part of the pressure waves emanating from the rotating fan tip.

Location of the flow sensors after the intake throat may take advantage of a more uniform flow profile.

Using a known stagnation temperature and pressure upstream of the compressor (i.e. proximal the intake) allows accurate determination of mass-flow and other airflow properties through the intake.

The inlet structure described herein may be part of a podded installation, or an installation embedded within the airframe structure.

The present disclosure provides a non-intrusive means of measuring air flow.

Whilst the system and method is described in relation to a gas turbine engine, it could be applied to a wall/intake of any other suitable turbomachine, such as an axial flow machine, typically involving high sub-sonic flow rates and a strict requirement for aerodynamic efficiency.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbomachine comprising:
an air flow measurement system including a plurality of acoustic sensors, the plurality of acoustic sensors being disposed upstream of a compressor of the turbomachine, the plurality of acoustic sensors being configured to transmit acoustic waveforms through an intake airflow to a plurality of further acoustic sensors;
a duct defined by an inner circumferential flow surface and an outer circumferential flow surface, the intake airflow flowing between the inner circumferential flow surface and the outer circumferential flow surface; and
an acoustic liner configured to absorb vibrations generated by rotation of a rotor, the acoustic liner being disposed entirely external to the outer circumferential flow surface and outside of the intake airflow, and the plurality of acoustic sensors being located upstream of the acoustic liner, wherein:
the plurality of further acoustic sensors are arranged entirely recessed in the inner circumferential flow surface, the plurality of further acoustic sensors being disposed outside of the intake airflow,
the plurality of acoustic sensors are located in the outer circumferential flow surface in a single plane, the plurality of further acoustic sensors are configured to communicate with the plurality of acoustic sensors at a point intercepting the single plane, and the acoustic liner is located upstream of a fan that is positioned at an airflow intake of the turbomachine.

2. The turbomachine of claim 1, wherein the plurality of acoustic sensors and the plurality of further acoustic sensors are provided as a circumferential array about the duct.

3. The turbomachine of claim 1, wherein the acoustic sensors do not protrude into the airflow intake or are mounted behind a gas-washed surface of the airflow intake.

4. The turbomachine of claim 1, wherein the acoustic sensors are located downstream of an intake throat.

5. The turbomachine of claim 1, wherein the acoustic sensors are configured to generate tomographic data of airflow through the airflow intake.

6. The turbomachine of claim 1, wherein the number of the plurality of acoustic sensors is in a range of 2 to 40.

7. The turbomachine of claim 1, wherein the inner circumferential flow surface rotates about an axial axis and the plurality of further acoustic sensors is configured to rotate with the inner circumferential flow surface.

8. The turbomachine of claim 7, wherein the inner circumferential flow surface is a surface of a rotor hub or nose cone.

9. The turbomachine of claim 1, wherein the acoustic sensors are mounted in a nacelle or rotor case of the turbomachine.

10. The turbomachine of claim 1, further comprising a gas turbine engine for an aircraft comprising:
an engine core including a turbine, the compressor, and a core shaft connecting the turbine to the compressor; wherein the fan is located upstream of the engine core and comprises a plurality of fan blades; and
a gearbox that receives an input from the core shaft and outputs drive to the fan so as to drive the fan at a lower rotational speed than the core shaft.

11. The turbomachine of claim 10, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

12. The turbomachine of claim 1, wherein the plurality of further acoustic sensors are located upstream of the fan.

13. A system configured to determine air flow through a turbomachine, the system comprising:
a plurality of acoustic sensors provided upstream of a compressor of the turbomachine, the plurality of acoustic sensors being configured to transmit acoustic waveforms through an intake airflow to a plurality of further acoustic sensors;
a duct of the turbomachine defined by an inner circumferential flow surface and an outer circumferential flow surface, the intake airflow flowing between the inner circumferential flow surface and the outer circumferential flow surface;
an acoustic liner configured to absorb vibrations generated by rotation of a rotor, the acoustic liner being disposed entirely external to the outer circumferential flow surface and outside of the intake airflow, and the plurality of acoustic sensors being located upstream of the acoustic liner, and a processing system configured to receive signals from the plurality of acoustic sensors and the plurality of further acoustic sensors and determine a flow rate of the intake airflow, wherein:
the plurality of further acoustic sensors are arranged entirely recessed in the inner circumferential flow surface, the plurality of further acoustic sensors being disposed outside of the intake airflow,
the plurality of acoustic sensors are located in the outer circumferential flow surface in a single plane,
the plurality of further acoustic sensors are configured to communicate with the plurality of acoustic sensors at a point intercepting the single plane, and
the acoustic liner is located upstream of a fan that is positioned at an airflow intake of the turbomachine.

14. The system of claim 13, wherein the processing system is configured to determine a time of flight of at least one of the acoustic waveforms between at least one of the plurality of acoustic sensors and one of the plurality of further acoustic sensors.

15. The system of claim 14, wherein the processing system is configured to determine an average flow velocity of the intake airflow.

16. The system of claim 14, wherein the plurality of acoustic sensors and the plurality of further acoustic sensors are configured to determine a flow profile across a cross-section of the airflow intake or to generate tomographic data of the intake airflow.

17. The system of claim 13, wherein the plurality of further acoustic sensors are located upstream of the fan.

18. A method of determining air flow properties of an intake airflow of a turbomachine, the method comprising steps of:
providing signal communication between a plurality of acoustic sensors and a plurality of further acoustic sensors located in a single plane defined by the plurality of acoustic sensors and the plurality of further acoustic sensors provided upstream of a compressor of the turbomachine;
determining a time of flight of acoustic waveforms between the plurality of acoustic sensors and the plurality of further acoustic sensors; and
using a time of flight between the plurality of acoustic sensors and the plurality of further acoustic sensors to determine an average flow velocity of the intake airflow, wherein
the turbomachine includes:
a duct defined by an inner circumferential flow surface and an outer circumferential flow surface, the intake airflow flowing between the inner circumferential flow surface and the outer circumferential flow surface, and
an acoustic liner configured to absorb vibrations generated by rotation of a rotor, the acoustic liner being disposed entirely external to the outer circumferential flow surface and outside of the intake airflow, and the plurality of acoustic sensors being located upstream of the acoustic liner,
the plurality of further acoustic sensors are arranged entirely recessed in the inner circumferential flow surface, the plurality of further acoustic sensors being disposed outside of the intake airflow, and
the acoustic liner is located upstream of a fan that is positioned at an airflow intake of the turbomachine.

19. The method of claim 18, wherein the time of flight between the plurality of acoustic sensors and the plurality of further acoustic sensors is used to determine an average mass flow of the intake airflow.

20. The method of claim 18, wherein the plurality of further acoustic sensors are located upstream of the fan.

* * * * *